United States Patent
Wurst et al.

[11] Patent Number: 6,050,308
[45] Date of Patent: Apr. 18, 2000

[54] DEVICE FOR FILLING POWDER INTO HARD GELATIN CAPSULES OR THE LIKE

[75] Inventors: Reiner Wurst, Auenwald; Eberhard Krieger, Weinstadt; Manfred Kuhnle, Schwaikheim; Werner Runft, Winnenden, all of Germany

[73] Assignee: Robert Bosch GmbH, Stuttgart, Germany

[21] Appl. No.: 09/142,411

[22] PCT Filed: Mar. 12, 1997

[86] PCT No.: PCT/DE97/00474

§ 371 Date: Dec. 30, 1998

§ 102(e) Date: Dec. 30, 1998

[87] PCT Pub. No.: WO97/41821

PCT Pub. Date: Nov. 13, 1997

[30] Foreign Application Priority Data

May 7, 1996 [DE] Germany .......................... 196 18 237

[51] Int. Cl.[7] ...................................................... B65B 1/04
[52] U.S. Cl. .................. 141/81; 141/71; 141/146
[58] Field of Search ............................. 141/71, 81, 73, 141/144, 145, 146, 18, 2

[56] References Cited

U.S. PATENT DOCUMENTS 5,240,049 8/1993 Chiari ......................................... 141/81
5,855,233 1/1999 Bolelli ....................................... 141/144

Primary Examiner—Steven O. Douglas
Attorney, Agent, or Firm—Ronald E. Greigg; Edwin E. Greigg

[57] ABSTRACT

A device for filling powder into hard gelatine capsules or the like has an incrementally rotated metering disk. A spacer disk is disposed underneath the metering disk and is coupled to the metering disk. In order to change the volumes of the compressed charges comprised of powder, sleeves are inserted in the bottom of the metering disk, which dip into second bores of the spacer disk, and to embody the distance a between the underside of the metering disk and the spacer disk so that the distance $\underline{a}$ can be changed by means of an adjusting screw. The device according to the disclosure is relatively simple in design and prevents non-homogeneities in the powder.

9 Claims, 2 Drawing Sheets

DEVICE FOR FILLING POWDER INTO HARD GELATIN CAPSULES OR THE LIKE

Description

The invention is based on a device for filling powder into hard gelatine capsules or the like. A device of this kind has been disclosed by DE 23 46 070 A1. The known device has pins for changing the volumes of compressed powder charges and these pins dip into bores of a cyclically rotating metering disk. With the aid of first plungers, the compressed powder charges are transferred from a filling disk into the metering disk and the sections of the compressed powder charges that protrude corresponding to the immersion depth of the pins are shorn off when the filling disk rotates further. In order to transfer the compressed powder charges into the supplied capsule bottoms by means of second plungers, the pins are first moved out of the bores of the metering disk. When the device is otherwise functioning satisfactorily, with particular types of powder, the shearing off of the compressed powder charges can cause an undesirable lack of homogeneity of the powder in the filling disk to occur. Furthermore, a costly construction and precise manufacturing of the device are required since before the transfer of the compressed powder charges to the capsule bottoms, the pins must be moved out of the bores of the metering disk each time and then dipped back in again, and for functional reasons, only a slight gap is permissible between the pins and the bores in the metering disk.

The object of the invention is to reduce the non-homogeneities of the powder in the filling disk during operation of a device of this generic type and at the same time, to achieve as simple as possible a construction of the device.

Other advantages and advantageous improvements of the device according to the invention for filling powder into hard gelatine capsules or the like ensue from the hereinafter and the description. A simpler transfer and undamaged compressed powder charges during the insertion into the capsule bottoms are achieved by virtue of the fact that the tops of the sleeves end flush with the bottom of the metering disk so that during transfer, the compressed powder charges do not have to be slid over a shoulder. It is also particularly advantageous to provide adjusting means that cooperate with the metering disk to change the volumes of the compressed charges. In this instance, no adjustment of the take-over wheel that receives the capsule bottoms is necessary, independent of the adjusted volumes.

BRIEF DESCRIPTION OF THE DRAWINGS

An exemplary embodiment of the invention is depicted in the drawings and will be explained in more detail in the description below.

DESCRIPTION OF THE EXEMPLARY EMBODIMENT

Figure 1:
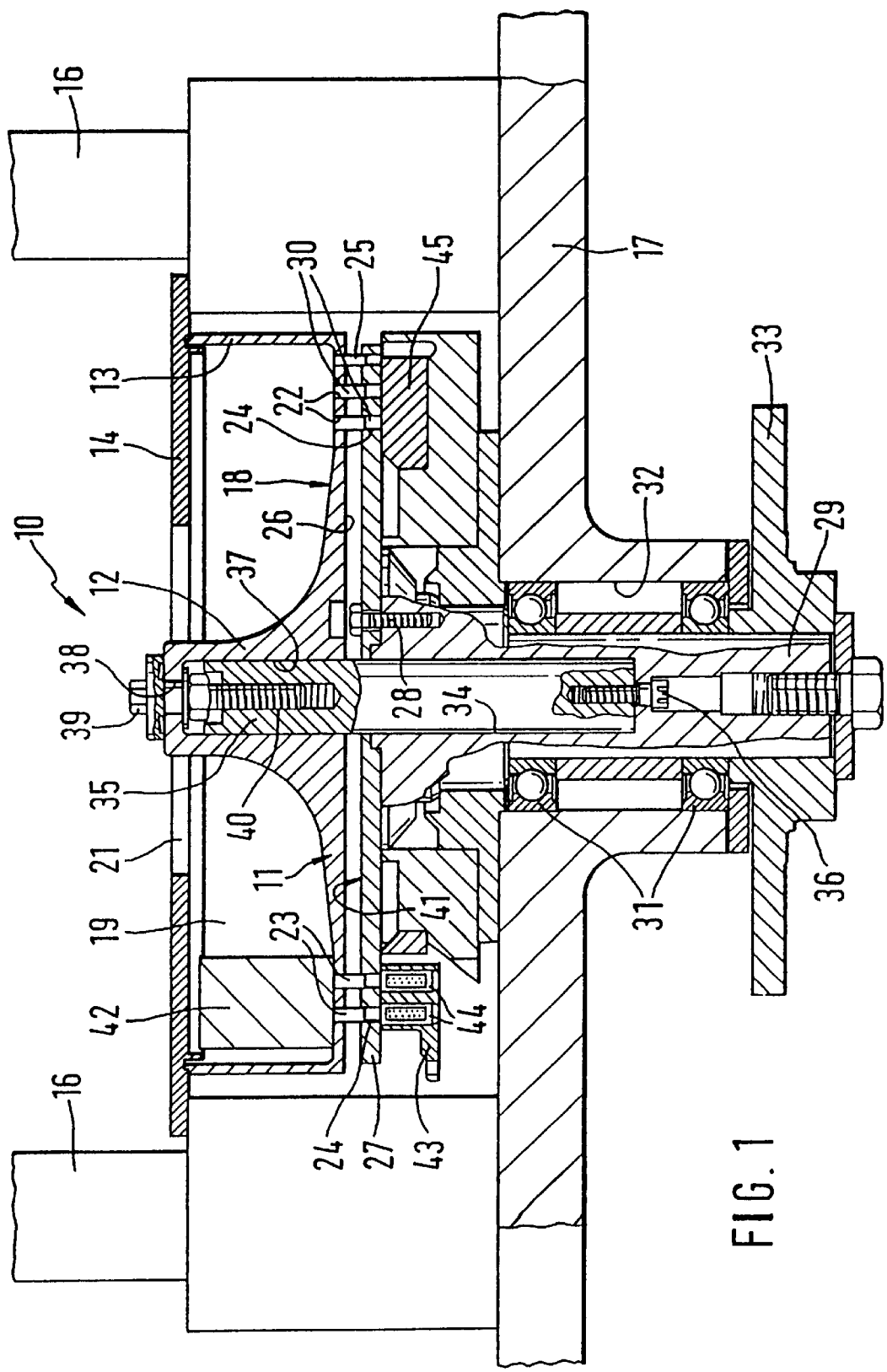
FIG. 1 is a longitudinal section through a device for filling powder into hard gelatine capsules or the like, and FIGS. 2 and 3 are longitudinal sections through a part of the device according to FIG. 1, in two end positions of the spacer disk.

The device 10 for filling powder into hard gelatine capsules or the like, which is represented in FIG. 1, has an essentially cup-shaped metering disk 11 that rotates incrementally around a rotational axis 1 and has a hub region 12 disposed in the rotational axis 1 and a continuous side wall 13 embodied on the circumference of the metering disk 11. The open upper end face of the metering disk 11 is covered with a cap 14, which is fastened to two columns 16. The columns 16 are disposed on a table 17 that supports the device 10. A storage chamber 19 for the powder is embodied by the bottom 18 of the metering disk 11, the underside of the cap 14 and the side wall 13 of the hub region 14. The cap 14 has a centrally disposed opening 21 for the refilling of powder into the storage chamber 19. A number of groups of first bores 22, into which the sleeves 23 are firmly inserted, are embodied in the bottom 18 of the metering disk 11. The upper end faces of the sleeves 23 end flush with the bottom 18 of the metering disk 11. The sleeves 23 protrude at least partially into second bores 24 of a spacer disk 27 disposed parallel to the flat underside 26 of the metering disk 11. The spacer disk 27 and the metering disk 11 are non-rotatably connected to each other by means of a pin 25 disposed in the bottom 18 in the region of the side wall 13. The sleeves 23 and the second bores 24 embody volumes 30 that are used in tamping stations to form compressed powder charges, not shown, by means of intrinsically known tamping plungers which are disposed in the storage chamber 19, can be moved up and down, and are not shown in the drawing.

The spacer disk 27 is non-rotatably connected to a shaft stump 29 by means of a screw connection 28. The shaft stump 29 is rotatably connected to two bearing bodies 31 in a receptacle 32 embodied in the table 17. On the end disposed opposite the spacer disk 27, the shaft stump 29 is connected to a drive wheel 33 that is coupled, for example, to a drive that is not shown, for example a stepping motor or servomotor.

Another bore 34 is embodied flush with the rotational axis 1 on the end face of the shaft stump 29 disposed opposite from the drive wheel 33, and a cylindrical intermediary piece 35 is inserted into this bore. The intermediary piece 35 is axially fixed in the shaft stump 29 by means of a screw 36. The intermediary piece 35 passes through the spacer disk 27 and protrudes into a bore 37 embodied centrally in the hub region 12 of the metering disk 11 and this bore is used to axially guide the metering disk 11 on the intermediary piece 35.

Figure 2:
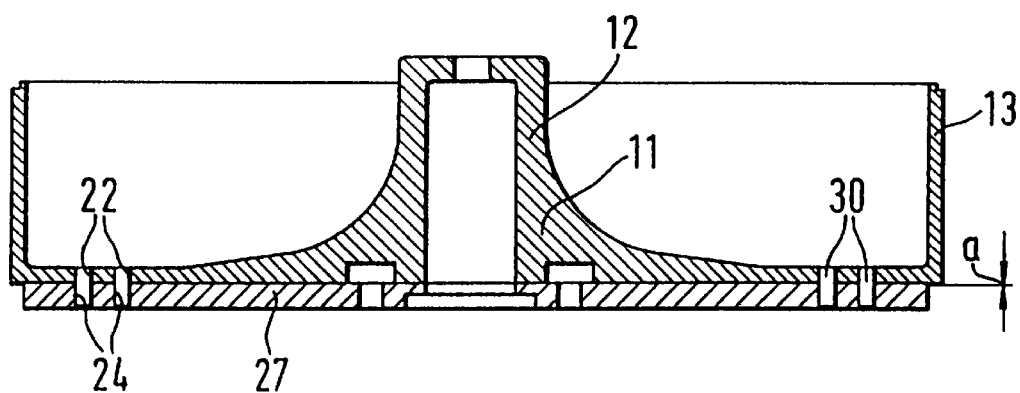
Figure 3:
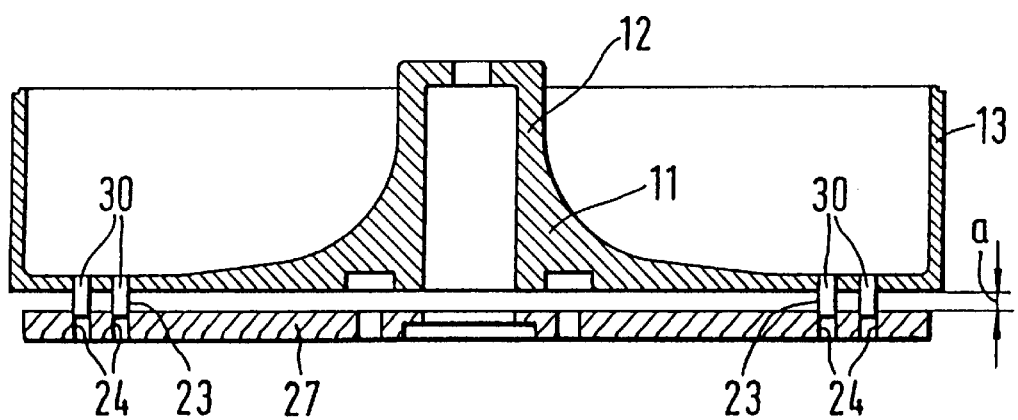

A hole 38 is provided in the bottom of the bore 37 and an adjusting screw 39 connected to the hub region 12 and the metering disk 11 protrudes through this hole. The adjusting screw 39 engages in a threaded bore 40 embodied in the shaft piece 35. The distance $\underline{a}$ between the underside 26 of the metering disk 11 and the top side 41 of the spacer disk 27 can be smoothly adjusted between two end positions by means of the adjusting screw 39. In the one end position (FIG. 2), the metering disk 11 rests on the spacer disk 27 and the distance $\underline{a}$ is zero. Consequently, the volumes 30 that are for the compressed charges and are embodied by the sleeves 23 and the second bores 24 assume a minimum. In the other end position (FIG. 3), in which the distance $\underline{a}$ is so great that sleeves 23 protrude only slightly into the second bores 24, the volumes 30 assume their maximum.

The device 10 is completed by means of the abovementioned tamping stations, not shown, which are disposed in the storage chamber 19, are connected to the columns 16, and are for pressing the powder into the volumes 30, a powder deflector 42 is disposed in the storage chamber 19, a transfer station, likewise not shown, for transferring the formed compressed charges into supplied capsule bottoms, and a take-over wheel 43 disposed underneath the spacer disk 27.

The take-over wheel 43, whose rotational axis is aligned parallel to the rotational axis 1 of the metering disk 11, has a number of capsule receptacles 44 for the capsule bottoms that corresponds to the number of second bores 24, wherein the capsule receptacles 44 are disposed flush with the second bores 24. A pressing ring 45, which is used as a counter support for the tamping plungers, is disposed in the region of the underside 26 of the spacer disk 27 not overlapped by the take-over wheel 43, at least coinciding with the second bores 24 and with the smallest possible distance from the spacer disk 27.

The operation of the device 10 is known in and of itself and will therefore be only briefly described: The incrementally rotating metering disk 11 comes to rest respectively in the regions of the tamping stations. There, powder is pressed by the tamping plungers into the volumes 30 embodied by the sleeves 23 and the second bores 24. This procedure is repeated at each of the total of four tamping stations, for example, so that compressed charges of powder are formed in the volumes 30, which are transferred into the capsule bottoms supplied in the capsule receptacles 44 of the take-over wheel 43. During the further rotation of the take-over wheel 43, the capsule bottoms are closed with the capsule tops in a closing station.

The possible volume of the compressed charges, which corresponds to the size of the capsule bottoms or capsules, can be adjusted by means of the distance a between the axially stationary metering disk 11 and the spacer disk 27, by way of the adjusting screw 39.

The foregoing relates to preferred exemplary embodiments of the invention, it being understood that other variants and embodiments thereof are possible within the spirit and scope of the invention, the latter being defined by the appended claims.

We claim:

1. A device for filling powder into hard gelatine capsules or the like, comprising a metering disk (11), which is embodied by means of side walls (13) of a storage chamber (19) for the powder and rotates incrementally around a perpendicular rotation axis, and the bottom (18) of this metering disk has first bores (22) that receive the powder, in which the powder is formed into compressed charges by means of tamping plungers, with means for inserting the compressed charges into capsule bottoms supplied beneath the metering disk (11) and with means for changing the volumes of the compressed charges, the means for changing the volumes (30) include a spacer disk (27) that rotates synchronously with the metering disk (11) and is disposed between the metering disk (11) and the supplied capsule bottoms and has second bores (24) which are aligned with the first bores (22) in the metering disk (11), that a variable distance a between the metering disk (11) and the spacer disk (27) in the direction of the rotational axis can be adjusted and that a sleeve (23), which dips at least part way into the first and second bores (22, 24) aligned in relation to one another, is disposed in each of the bores and permits the distance a between the first and second bores (22, 24) to be bridged.

2. The device according to claim 1, in which the sleeves (23) are fixed in the bottom (18) of the metering disk (11) and that the end faces of the sleeves (23) oriented toward the metering disk (11) end flush with a top side of the bottom (18) of the metering disk (11).

3. The device according to claim 2, in which the distance a between the metering disk (11) and the spacer disk (27) can be changed using adjusting means (39), which act on the metering disk (11).

4. The device according to claim 3, in which the spacer disk (27) is non-rotatably fixed to a drive shaft (29) and that the metering disk (11) is disposed so that the metering disk can move axially on an axle (35) connected to the drive shaft (29).

5. The device according to claim 2, in which the spacer disk (27) is non-rotatably fixed to a drive shaft (29) and that the metering disk (11) is disposed so that the metering disk can move axially on an axle (35) connected to the drive shaft (29).

6. The device according to claim 1, in which the spacer disk (27) is non-rotatably fixed to a drive shaft (29) and that the metering disk (11) is disposed so that the metering disk can move axially on an axle (35) connected to the drive shaft (29).

7. The device according to claim 6, in which the metering disk (11) and the spacer disk (27) are connected by means of a pin (25) disposed parallel to the rotational axis, and this pin acts as a rotation prevention means and passes at least part way through the metering disk (11) and the spacer disk (27).

8. The device according to claim 1, in which the distance a between the metering disk (11) and the spacer disk (27) can be changed using adjusting means (39), which act on the metering disk (11).

9. The device according to claim 8, in which the spacer disk (27) is non-rotatably fixed to a drive shaft (29) and that the metering disk (11) is disposed so that the metering disk can move axially on an axle (35) connected to the drive shaft (29).

* * * * *